United States Patent [19]

Strasheim et al.

[11] 4,320,972
[45] Mar. 23, 1982

[54] VACUUM SPECTROMETER HAVING A NUMBER OF REMOTELY POSITIONABLE NARROW WAVELENGTH DETECTORS

[75] Inventors: Albertus Strasheim; Eberhard M. Thain, both of Pretoria, South Africa

[73] Assignee: South African Inventions Development Corporation, Pretoria, South Africa

[21] Appl. No.: 135,584

[22] Filed: Mar. 31, 1980

[51] Int. Cl.³ .......................... G01J 3/04; G01J 3/20; G01J 3/38
[52] U.S. Cl. ..................................... 356/328; 356/334
[58] Field of Search .............. 356/326, 327, 328, 331, 356/332, 334

[56] References Cited

U.S. PATENT DOCUMENTS

| | | | |
|---|---|---|---|
| 2,572,119 | 10/1951 | Dieke | 356/306 |
| 3,442,593 | 5/1969 | Marcovecchio et al. | 356/310 |
| 3,498,720 | 3/1970 | Kohlhaas et al. | 356/328 X |
| 3,594,083 | 7/1971 | Barringer | 356/328 X |
| 3,880,523 | 4/1975 | Thomas | 356/328 X |
| 4,140,399 | 2/1979 | Jänchen | 356/334 X |

Primary Examiner—Vincent P. McGraw
Attorney, Agent, or Firm—Ladas & Parry

[57] ABSTRACT

A spectrometer of the Rowland circle type having an annular steel table on which are supported a plurality of wheeled carriages. Each carriage has a remotely operable magnetic clamping arrangement to clamp it to the table. Each carriage also has a light entrance slit located in the focal plane, a photo-multiplier tube, and an optical fibre for channelling light from the entrance slit to the photo-multiplier tube. A positioning arm, pivotal about a central axis, is provided. The arm has at its free end a gripping arrangement which is remotely operable to grip any selected carriage. The arm is also remotely positionable to any position on the circle so that any particular carriage can be engaged; displaced to any desired new position; disengaged; and left clamped in the new position. An arcuate rule with an optical read head is also provided whereby the position of the arm is determined. The arm and the carriages are in an evacuated and thermally and structurally insulated housing.

21 Claims, 9 Drawing Figures

VACUUM SPECTROMETER HAVING A NUMBER OF REMOTELY POSITIONABLE NARROW WAVELENGTH DETECTORS

This invention relates to an apparatus and method for studying spectra. The spectra may be qualitatively, quantitatively or graphically studied. Thus, the apparatus may be a spectrometer, spectrograph, spectrophotometer or the like.

The applicant is aware of spectrographic equipment which have displaceable elements that are manually displaced to suitable positions to address desired parts of a spectrum. As these elements have to be manually displaced it is a laborious task to change the positions of the elements and it is very difficult to set their positions accurately. Further, in order to obtain desired degrees of accuracy the elements should preferably be in a thermally stable and controlled environment. If the elements are manually positioned then it is extremely difficult or time consuming to stabilise the environment after positioning of the elements.

It is an object of the invention to provide a spectroscopic apparatus which can be easily and quickly adjusted to address different parts of the spectrum with a high degree of accuracy.

Accordingly, the invention provides a spectroscopic apparatus for studying a radiated spectrum, characterised in that it includes a plurality of detecting means for detecting radiation, the detecting means each being remotely positionable at desired positions on the spectrum; and a positioning means that is selectively engageable and disengageable with any desired one of the detecting means for engaging the said desired detecting means, positioning it at a desired position on the spectrum and disengaging the detecting means to leave it at the desired position.

The apparatus may include a clamping means for clamping the detecting means in position. This clamping means may be remotely operable. Further, the clamping means may act on all the detecting means together, such that they are all clamped or unclamped together. Preferably each detecting means may have its own clamping means, the clamping means being selectively operable. Thereby, all the detecting means other than a particular one being positioned may be held clamped in position while the said detecting means is being positioned. The clamping means may be operable in any suitable manner-magnetically, mechanically, pneumatically, or the like.

In a preferred embodiment, the detecting means may comprise detecting modules that are suitably supported on a support surface such as a planar platform or table. With such an arrangement the modules may be wheeled. It will be appreciated that the modules could be supported in any suitable way and may be guided by a suitable means such as rails or tracks.

Each detecting means may have a radiation window means, such as a slit, for determining the band width of radiation that is to be detected by each detecting means. The apparatus may also include a focussing means for focussing radiation onto a focal plane. The positioning means may then be adapted to position the detecting means with their slits in the focal plane. These slits are referred to hereinafter as 'entrance slits'.

The positioning means may also be operable in any suitable manner, such as mechanically, electro-mechanically, magnetically, pneumatically, or the like. It is preferred that the positioning means be mechanical in form and have a suitable gripping means for gripping the desired module. This gripping means may similarly be operable in any suitable manner-such as mechanically, magnetically, pneumatically, or the like. In order to ensure that the modules are clamped in the correct positions, the gripping means and clamping means may be such that the modules are clamped before they are released from the positioning means. Further, the gripping means may be such that it exerts no, or minimal, force on the modules in directions parallel to the support surface.

The apparatus may also include a position indicating or determining means for determining or indicating the position of the positioning means. Still further, the apparatus may include a control means for operating the positioning means to displace it to a desired or predetermined position as determined by the position determining means. A recording means may also be provided for recording the position of the detecting modules. Thus, a module may accordingly be positioned at a particular position to address a particular part of a known spectrum, this position being recorded in the recording means. If it is then desired to examine or study this part of an unknown spectrum a module is then positioned at the position recorded in the recording means. The position determining means may be operable by determining the distance of a particular position from a datum position.

Those skilled in the art will understand that as detecting devices are relatively large it is not possible to have the entrance slit located close to the detecting device. Thus, the detecting modules will have detecting devices that are connected to their entrance slits by suitable radiation channeling means. Thus, for example, in optical applications, the connecting means may be an optical fibre or a passageway with suitable mirrors or prisms. Referring to the detecting devices these may be suitable for the particular spectrum being studied. Thus, with optical spectra, the detecting devices may be any photosensitive device, such as a photo-transistor, a photo-multiplier tube, or the like.

It will further be appreciated by those skilled in the art that due to the size of such detecting devices they may be housed in body portions of the detecting means that have a width greater than that of their window means. The window means of successive detecting means may accordingly be progressively offset with respect to their body portions, so that when the body portions are next to one another, so are the window means.

As the apparatus is preferably remotely operable, utilising electric command signals, a housing may be provided in which the various components are housed. Such a housing facilitates operation of the apparatus under thermally and structurally stable conditions. The interior of the housing may be evacuated.

It will finally be appreciated that although the invention relates most particularly to optical spectra, it is not restricted thereto.

The invention also provides a method of studying a spectrum characterised in that it includes selectively engaging any desired one of a plurality of detecting means by means of a positioning mechanism;

positioning the said desired detecting means at a desired position on the spectrum;

disengaging the positioning mechanism from the said detecting means; and leaving the detecting means at the desired position.

The method may include clamping the detecting means in position. All the detecting means may be clamped in position and when a particular detecting means is to be moved to a new position it may be unclamped, moved to the desired position and then clamped in the new position. Further a detecting means to be moved to a new position may be gripped by the positioning mechanism, unclamped, moved to the new position by the positioning mechanism, clamped in this position, and then the positioning mechanism may be released.

The positioning mechanism may be remotely operated and may be displaced a desired distance from a datum position.

The invention is now described, by way of an example, with reference to the accompanying drawings, in which.

Figure 1:
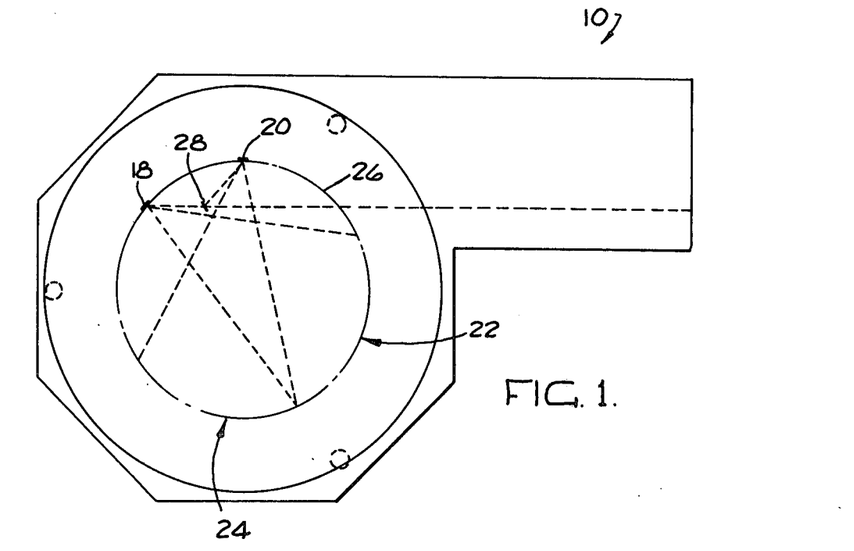
FIG. 1 shows a schematic plan view of a Rowland circle type optical spectrometer.
Figure 2:
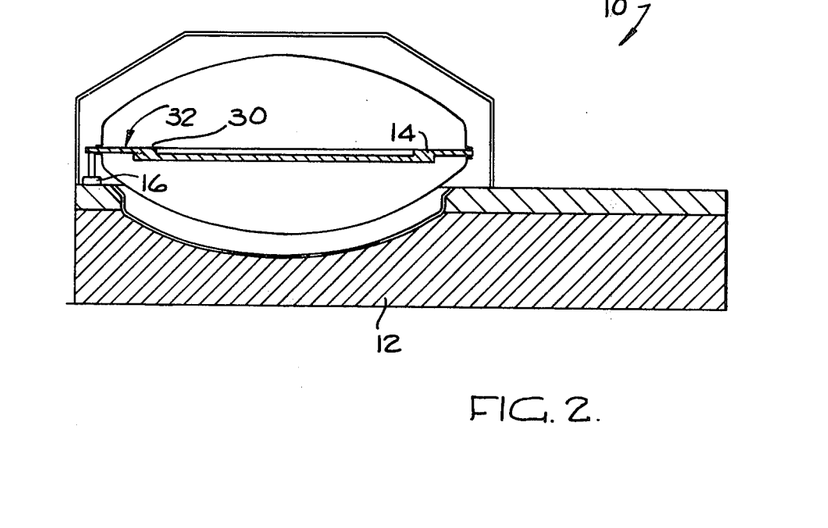
FIG. 2 shows a schematic sectioned view of the spectrometer.

Reference is initially made to FIGS. 1 and 2, in which the spectrometer is designated generally by numeral 10. The spectrometer 10 has a massy stabilising base 12 on which is supported a circular table 14, by means of levelling and isolating legs 16. The spectrometer 10 is of the Rowland circle type and has two diffraction gratings 18 and 20 which provide two spectra 22 and 24, the focal planes of which lie on the perimeter of the circle 26. The gratings 18 and 20 are illuminated with radiation via a beam splitter 28. A housing 29 is provided, the interior of which is evacuated via suitable ports (not shown).

As shown in FIG. 2, the table 14 has a central circular sunken region, the perimeter 30 of which is close to the perimeter of the circle 26. The table 14 thus has an annular platform 32.

Figure 3:
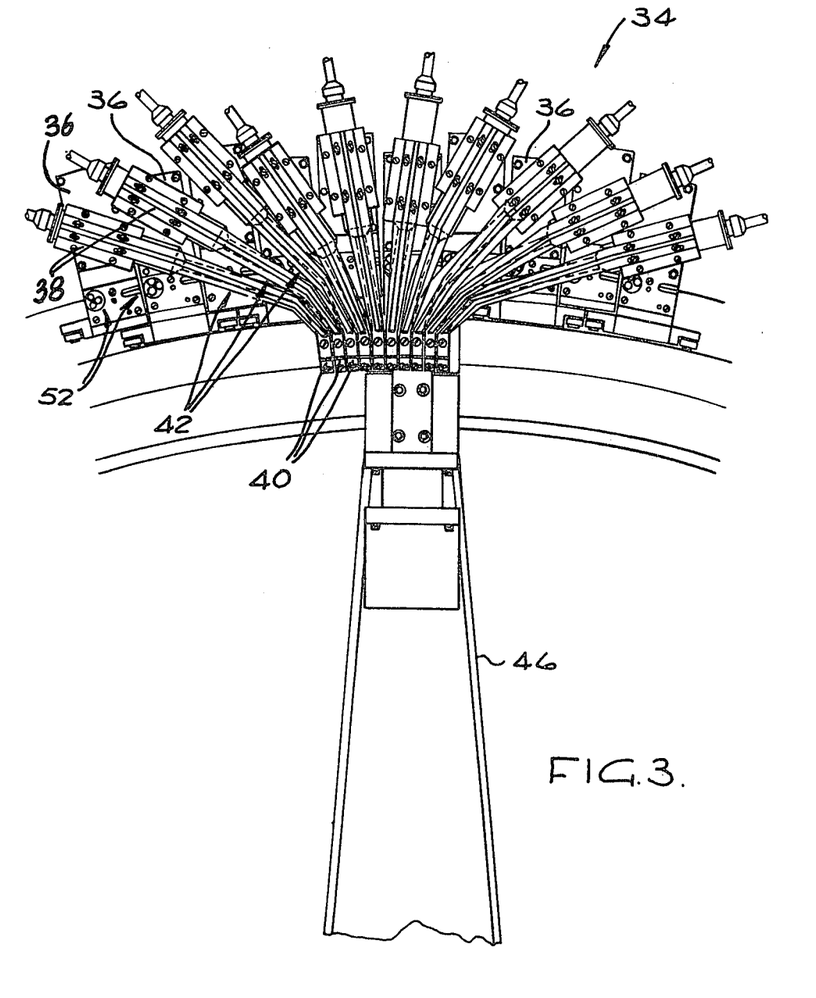
FIG. 3 shows a more detailed plan view of several detecting modules and a positioning arm of the spectrometer.
Figure 4A:
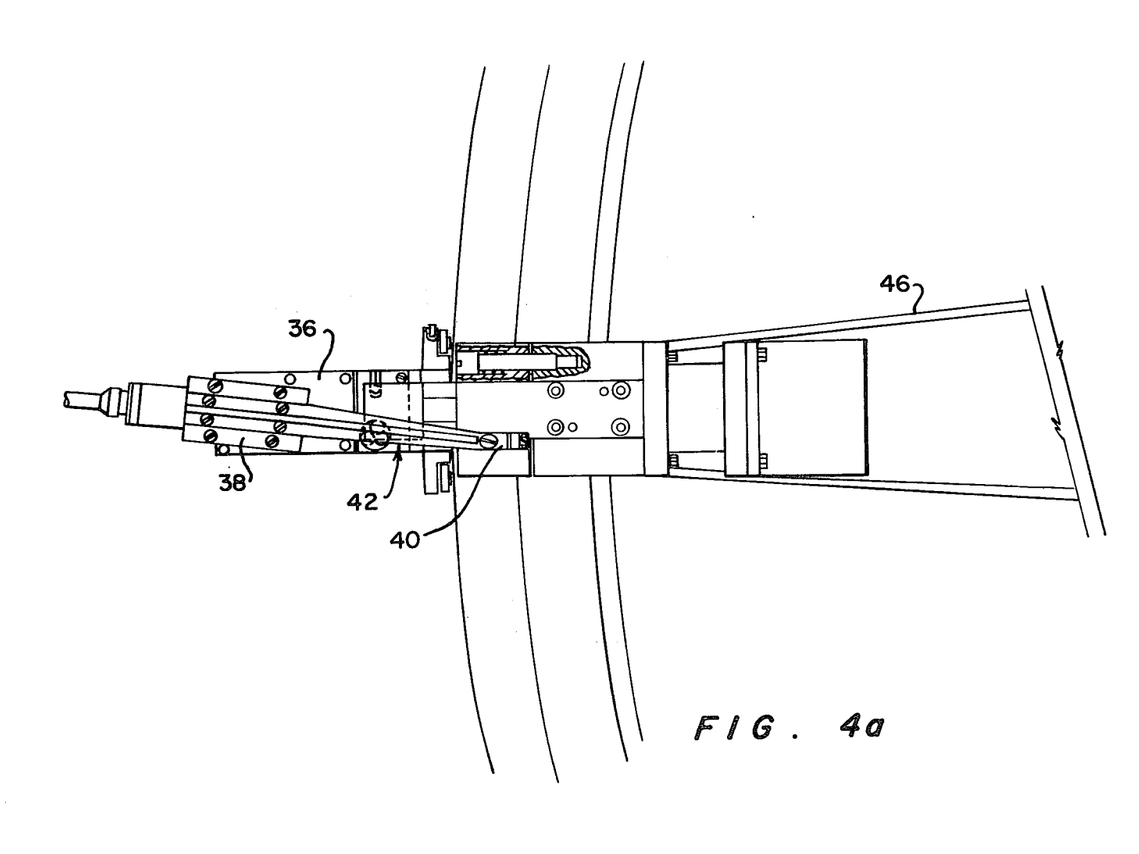
FIGS. 4a and 4b together show a view similar to that of FIG. 3, showing the positioning arm engaged with one of the modules.
Figure 4B:
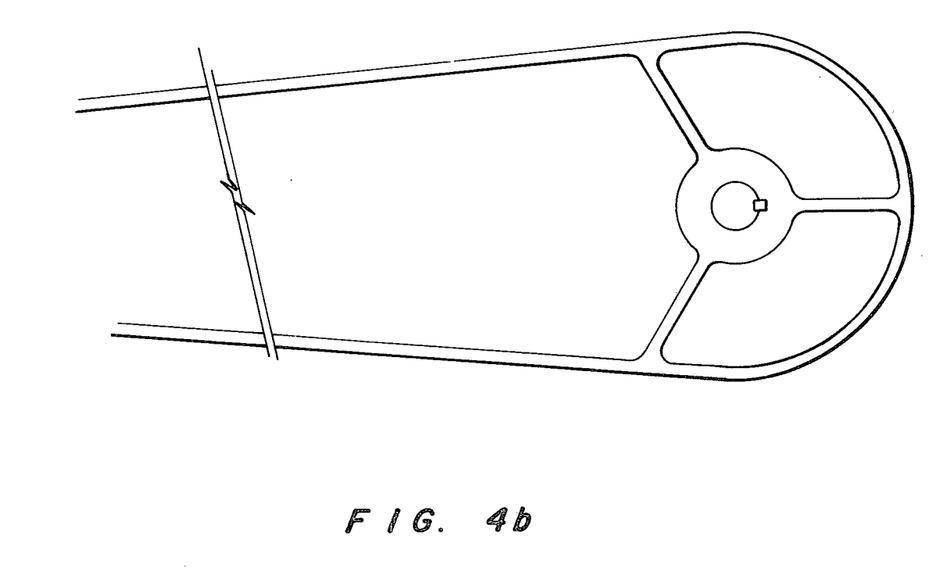
Figure 5A:
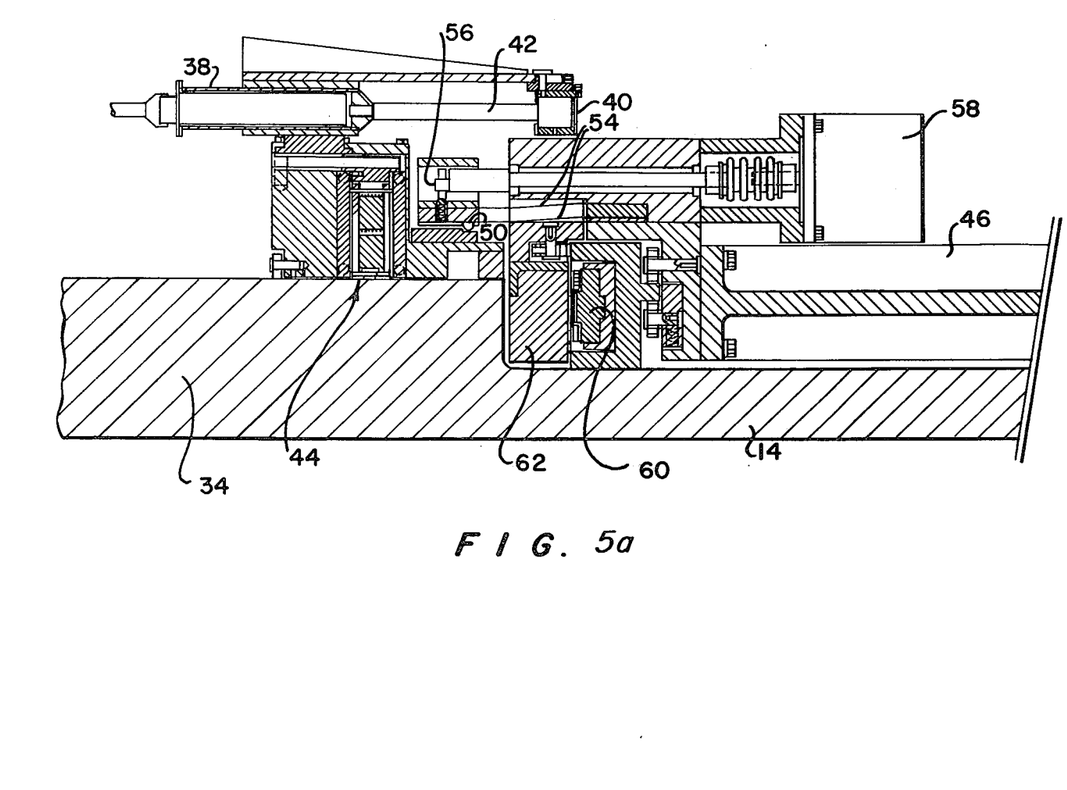
FIGS. 5a and 5b together show a longitudinal sectional view of the arm and module of FIG. 4.
Figure 5B:
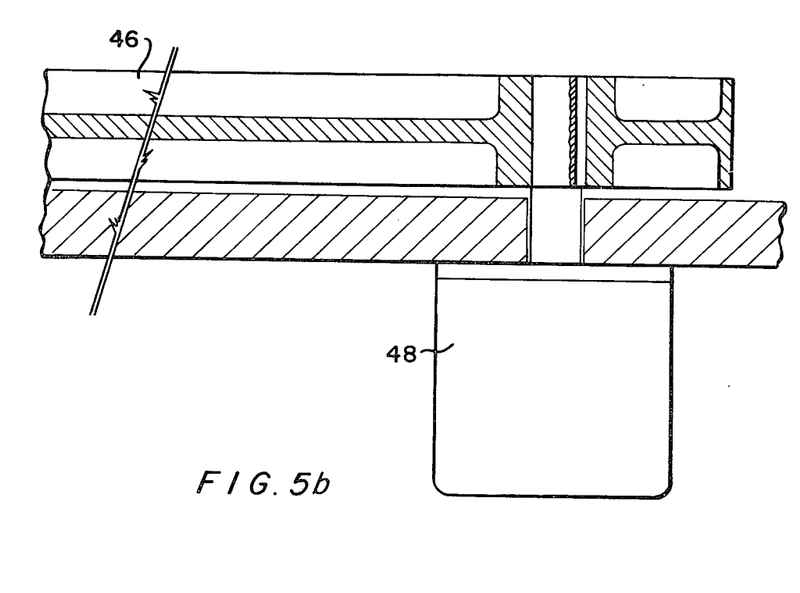
Figure 6:
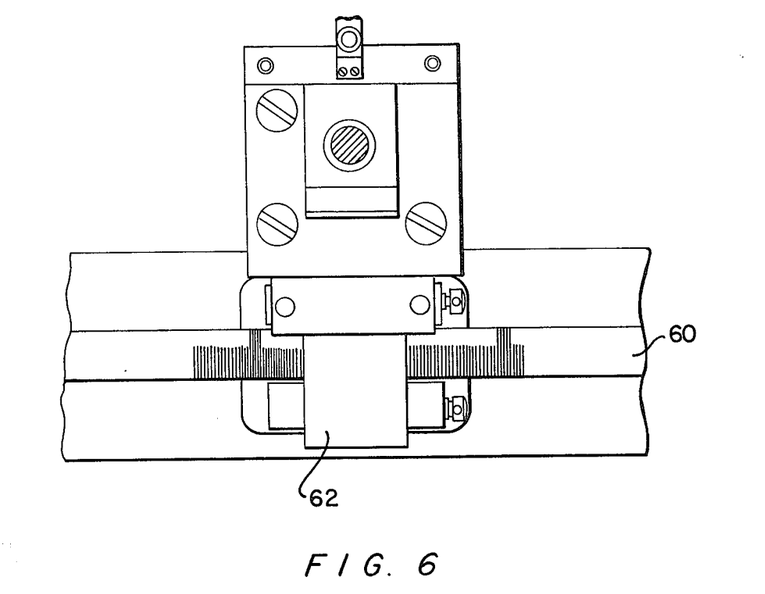
FIG. 6 shows an end view of the positioning arm.

Supported on this platform 32 are two sets of detecting modules, one set 34 being shown in FIG. 3. Reference is now made to this Figure and to FIGS. 4, 5 and 6. There is a set of detecting modules for each spectrum 22 and 24. Each detecting module comprises a wheeled carriage 36 on which is carried a photo-detector tube 38. Each photo-detector tube 38 is connected to an entrance slit housing 40 by means of an optical fibre 42. As is clearly shown in FIG. 3, the photodetector tubes 38 and their optical fibres 42 are progressively offset so that when the carriages 36 are in abutting relationship, their entrance slit housings 40 are also in abutting relationship. In this way, and as the entrance slit housings 40 are very thin, portions of the spectrum that are close together may be studied. Any intermediate portions of one spectrum, (say 22) between adjacent entrance slits, that may not be studied with the detecting modules for that spectrum, may be studied by the detecting modules of the other spectrum 24. As will also be appreciated from FIG. 3, the position of each entrance slit on the spectrum is offset from the position of its carriage by a constant amount that varies from module to module.

The table 14 is of steel, and each module 34 has, in its carriage 36, a clamping means in the form of two magnets and a yoke 44. The polarity of one magnet may be electrically switched so that the two magnets have the same or different polarities. If they have different polarities, then the magnetic circuit is completed through the yoke and the magnets and there is minimal magnetic attraction between the clamping means 44 and the table 14. However, if they have the same polarities, then there is a strong magnetic attraction with the table 14. The clamping means 44 is slidable up-and-down and is biased upwardly by a leaf spring. Thus, when the two magnets have the same polarities, the clamping means 44 is displaced downwardly into engagement with the upper surface of the table 14 thereby clamping the module in position; and when the magnets have different polarities the clamping means 44 is lifted away from the table 14, freeing the module. The magnet that may be switched is of the bi-stable type so that once it is switched to have a particular polarity by an electrical switching pulse, it retains that polarity until switched.

The modules may be displaced and positioned circumferentially by means of a positioning arm 46 which is pivoted at the centre of the circle 26 and may be pivotally displaced by means of an electric motor 48 which is driven from a suitable control unit (not shown). At its free end, the arm 46 has a gripping means which comprises a gripping plate 50 having projecting formations which are engageable with corresponding formations, (such as formations 52 in FIG. 3) on the carriages 36. The gripping plate 50 is displaceable upwardly and downwardly by being attached to the arm 46 by two parallel leaf springs 54. This manner of attachment provides a substantially horizontally rigid connection. The gripping plate 50 is displaced up and down by a cam 56 that is rotated by an electric motor 58, also controlled from the control unit. Thus, the arm 46 is rotated into alignment with one of the modules, the motor 58 is activated, causing the gripping plate 50 to engage the carriage 36, the clamping means 44 is switched to release the carriage, and the arm 46 is pivoted to a new desired position, displacing the module to this position, the clamping means 44 is switched to clamp the module in position, and the gripping plate 50 is disengaged. Due to the radial arrangement, the entrance slit will still be in the focal plane and will have an acceptable angle of acceptance due to the use of optical fibres, across the whole spectral arc.

The position of the arm 46 is determined by means of an arcuate rule 60 which is secured to the table 14 and which is optically scanned by a reading head 62 fast with the arm 46.

Figure 7:
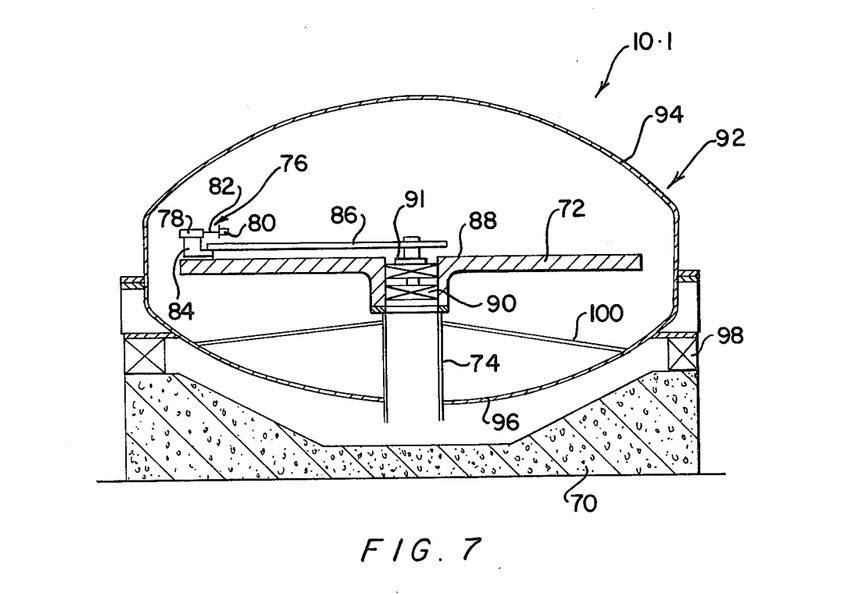
FIG. 7 shows a schematic view similar to FIG. 2 of a further embodiment of a spectrometer.

Referring to FIG. 7, the spectrometer 10.1 shown therein is similar to the spectrometer of FIGS. 1 to 6. This spectrometer 10.1 has a concrete base 70 with a table 72 supported by a central support 74. Detecting modules 76 are on the table 72, these modules 76 having photomultiplier tubes 78, entrance slit housings 80 and optical fibres 82 supported on carriages 84. The modules 76 are displaced by a positioning arm 86 that engages the modules 76 in a similar manner to that of the spectrometer 10 described above. This arm 86 is driven by a motor 88 and its position is determined by means of an encoding device 90. The spectrometer 10.1 further has a housing 92 formed from an upper cover 94 and a lower cover 96. The lower cover 96 is supported on the base 70 by means of shock-absorbing elements 98 and has strengthening ribs 100. This spectrometer is also evacuated with a rotary shaft seal 91 being provided.

By this means, a spectrometer may be remotely operated by means of relatively simple and inexpensive, yet reliable mechanisms. Further, the spectrometer may be easily calibrated using a known source, thereby precisely identifying the position of various spectral lines.

We claim:

1. A spectroscopic apparatus for studying a radiated spectrum, which includes
   a support surface,
   a plurality of detecting means for detecting radiation, displaceably supported on said surface, the detecting means each being remotely positionable at desired positions on the spectrum and each having a remotely operable clamping means for clamping the detecting means in position on said surface; and
   a single positioning means that is remotely selectively engageable and disengageable with any desired one of the detecting means for engaging the said desired detecting means, positioning it at a desired position on the spectrum and disengaging the detecting means to leave it at the desired position.

2. A spectroscopic apparatus as claimed in claim 1, in which the clamping means of all the detecting means are operated together.

3. A spectroscopic apparatus as claimed in claim 1, in which the clamping means are selectively operable.

4. A spectroscopic apparatus as claimed in claim 1, in which the detecting means are detecting modules.

5. A spectroscopic apparatus as claimed in claim 4, in which the support surface is planar and the detecting modules have wheels.

6. A spectroscopic apparatus as claimed in claim 1, in which each detecting means has a radiation window means for determining the band-width of radiation that is to be detected by each detecting means.

7. A spectroscopic apparatus as claimed in claim 6, which includes a focussing means for focussing radiation onto a focal plane with the positioning means being adapted to position the detecting means with their window means in the focal plane.

8. A spectroscopic apparatus as claimed in claim 1, in which the positioning means includes a gripping means for gripping any desired detecting means.

9. A spectroscopic apparatus as claimed in claim 8, in which the detecting means are detecting modules supported on a support surface, and the gripping means is adapted to exert a minimal force on the detecting modules in directions parallel to the surface.

10. A spectroscopic apparatus as claimed in claim 1, which includes a position indicating means for indicating the position of the positioning means.

11. A spectroscopic apparatus as claimed in claim 1, which includes a position determining means for determining the distance of the positioning means from a datum position.

12. A spectroscopic apparatus as claimed in claim 1, which includes a control means for controlling operation of the positioning means.

13. A spectroscopic apparatus as claimed in claim 6, in which each detecting means has a radiation detecting device that is a suitable distance from the window means and is connected thereto by a radiation channeling means.

14. A spectroscopic apparatus as claimed in claim 13, in which the radiation detecting device is housed in a body portion of the detecting means that has a width greater than that of the window means and the window means of successive detecting means are progressively offset with respect to their body portions.

15. A spectroscopic apparatus as claimed in claim 1, which includes a housing in which the detecting means and the positioning means are enclosed.

16. A spectroscopic apparatus as claimed in claim 1, which is an optical spectroscopic apparatus and the detecting means detect light radiation.

17. A method of studying a spectrum which includes
    remotely selectively engaging any desired one of a plurality of detecting means by means of a single positioning mechanism;
    remotely displacing the positioning mechanism to position the said desired detecting means at a desired position on the spectrum;
    remotely disengaging the positioning mechanism from the said detecting means; and
    remotely clamping the detecting means at the desired position.

18. A method as claimed in claim 17, in which all the detecting means are clamped in position and when a particular detecting means is to be moved to a new position it is remotely unclamped, moved to the desired position and then clamped in the new position.

19. A method as claimed in claim 18, in which a detecting means to be moved to a new position is gripped by the positioning mechanism, unclamped, moved to the new position by the positioning mechanism, clamped in this position, and then the positioning mechanism is released.

20. A method as claimed in claim 17, in which the positioning mechanism is displaced a desired distance from a datum position.

21. A spectroscopic apparatus for studying a radiated spectrum, which includes
    a plurality of detecting means for detecting radiation, the detecting means each being remotely positionable at desired positions on the spectrum and each having a radiation window means for determining the bandwidth of radiation that is to be detected by each detecting means, a body portion in which is housed a radiation detecting device that is a suitable distance from the window means, and a radiation channeling means connecting the window means with the radiation detecting device;
    the body portions having a width greater than that of their window means, and the window means of successive detecting means being progressively offset with respect to their body portions; and
    a single positioning means that is remotely selectively engageable and disengageable with any desired one of the detecting means for engaging the said desired detecting means, positioning it at a desired position on the spectrum and disengaging the detecting means to leave it at the desired position.

* * * * *